Figure 5:
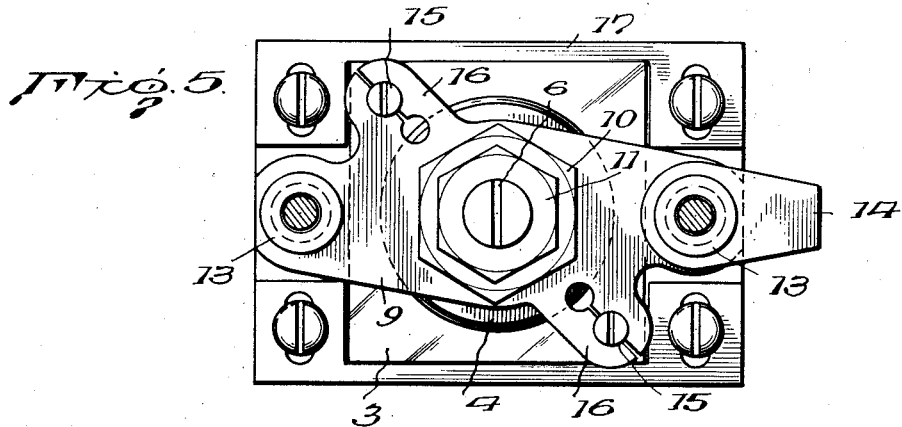

June 2, 1942.  J. M. WOLFSKILL  2,284,968
PIEZOELECTRIC CRYSTAL APPARATUS
Filed Sept. 6, 1941    3 Sheets-Sheet 1
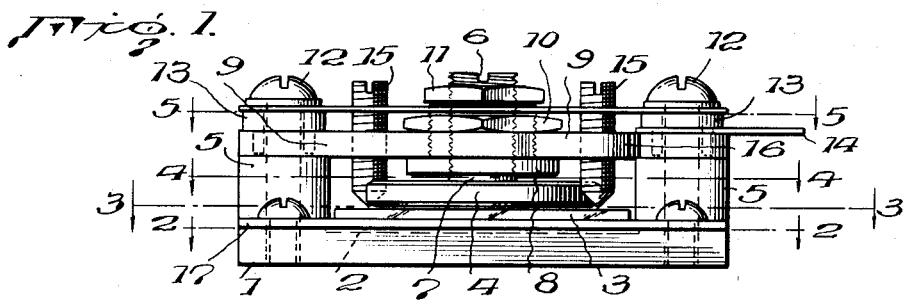
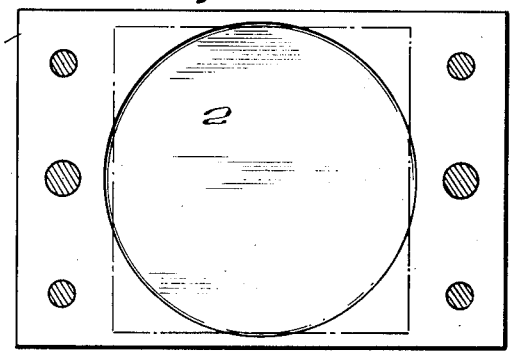
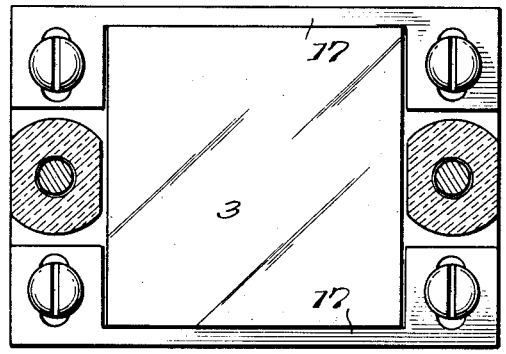
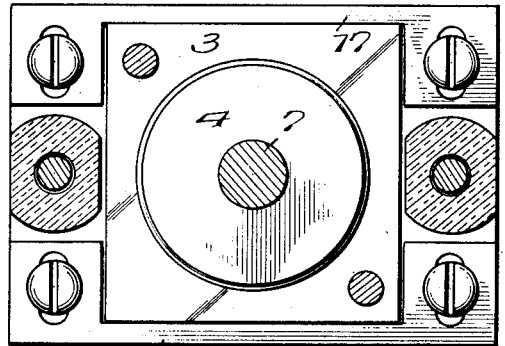
Inventor
John M. Wolfskill
By
Ben J. Lohmer
Attorneys June 2, 1942.   J. M. WOLFSKILL   2,284,968
PIEZOELECTRIC CRYSTAL APPARATUS
Filed Sept. 6, 1941   3 Sheets-Sheet 2

Inventor
John M. Wolfskill
By Ben. J. Cohran
Attorney

June 2, 1942.  J. M. WOLFSKILL  2,284,968
PIEZOELECTRIC CRYSTAL APPARATUS
Filed Sept. 6, 1941  3 Sheets-Sheet 3

Inventor
John M. Wolfskill
By Ben J. Chromy Attorney

Patented June 2, 1942

2,284,968

UNITED STATES PATENT OFFICE 2,284,968

PIEZOELECTRIC CRYSTAL APPARATUS

John M. Wolfskill, Erie, Pa., assignor to Bliley Electric Company, Erie, Pa., a partnership composed of F. Dawson Bliley and Charles Collman, partners, both of Erie, Pa.

Application September 6, 1941, Serial No. 409,887

14 Claims. (Cl. 171—327)

This invention relates to piezo-electric crystal apparatus, and more particularly to a method and apparatus for mounting piezo-electric crystals.

One of the main objects of the invention is to provide a means of mounting a quartz crystal so that the crystal is relatively free to move about in the holder, and yet the frequency change due to this movement is held to a very low value by the particular construction employed. The mounting of this invention employs some of the features of the mounting shown in my Patent No. 2,240,451.

Another object of the invention is to provide a mounting wherein low frequency crystals may be mounted in such a manner as to provide a maximum of activity without sacrificing frequency stability.

Another object is to provide a retaining adjustment on the holder so that the crystal movement towards and away from the electrodes can be held to a very minimum and done independently of the adjustable air-gap on the crystal mounting.

Another object is to provide a crystal mounting in which any distortion which takes place in the holder over a temperature range is not reflected onto the crystal, because the crystal is not clamped to the holder in any way; its movement is simply restrained.

In the prior art when it was desired to mount crystals of the low frequency plate type within the range of approximately 300 kc. to 1500 kc., the crystal was generally mounted between two ordinary plane faced electrodes with spacer means provided, generally of glass or ceramic, in which the spacers were of sufficient thickness as to allow an air-gap of several thousandths of an inch on at least one face of the crystal, the crystal resting against the opposite electrode. Retaining pins or some form of retaining member were used to keep the crystal from moving any appreciable amount in the plane of the electrodes. This left the crystal free to move back and forth from one electrode to the other by the amount of the air gap spacing during vibration or other handling. As a result, mountings of this type were very unstable in regard to frequency. Frequency variations in this type of mounting frequently are as much as .01% of the crystal frequency for various positions of the holder. The crystal frequency generally returns quite closely to the nominal value when the holder is returned to its original position, and the crystal again lies flat against one of the electrodes, and is spaced by the required gap from the second electrode.

For mobile service and many other applications, this type of crystal holder is definitely not practical because of the frequency modulation which results due to even a slight movement of the holder. Crystals in this frequency range generally cannot be clamped without seriously affecting their activity. It is therefore desirable to keep the crystal free and simply limit its movement, but even by restricting movement to exceptionally small tolerances, tolerances which are almost impractical from a manufacturing standpoint, it is still impossible to get exceptionally good frequency stability with the old type of mounting.

It is well known to those skilled in the art that the frequency change obtained with a variable air-gap type of crystal mounting is very rapid when the air-gap is small, the change in frequency decreasing rapidly as the air-gap is increased. I make use of this phenomenon in my present invention by providing and making certain that there is an air-gap on both sides of the crystal at all times and also making certain that the crystal cannot shift its position to or away from the electrodes. This does not affect the activity materially at these low frequencies, and it does increase the frequency stability very markedly. In fact, by employing my crystal holder, it is possible to get frequency stability with lower frequency crystals almost equivalent to that of a clamped higher frequency crystal. At the same time that I provide an air-gap on each side of the crystal, I provide a variable electrode so that the frequency may actually be slightly varied in setting the crystal unit to its nominal frequency. The air-gaps should be at least one and one-half thousandths of an inch on either side of the crystal, and these may be increased to three or four thousandths of an inch without materially affecting the activity, the frequency stability increasing as the air-gap is increased.

The various features of this invention will be apparent to those skilled in the art to which it relates from the following specification, claims and the drawings.

Figures 6, 7:
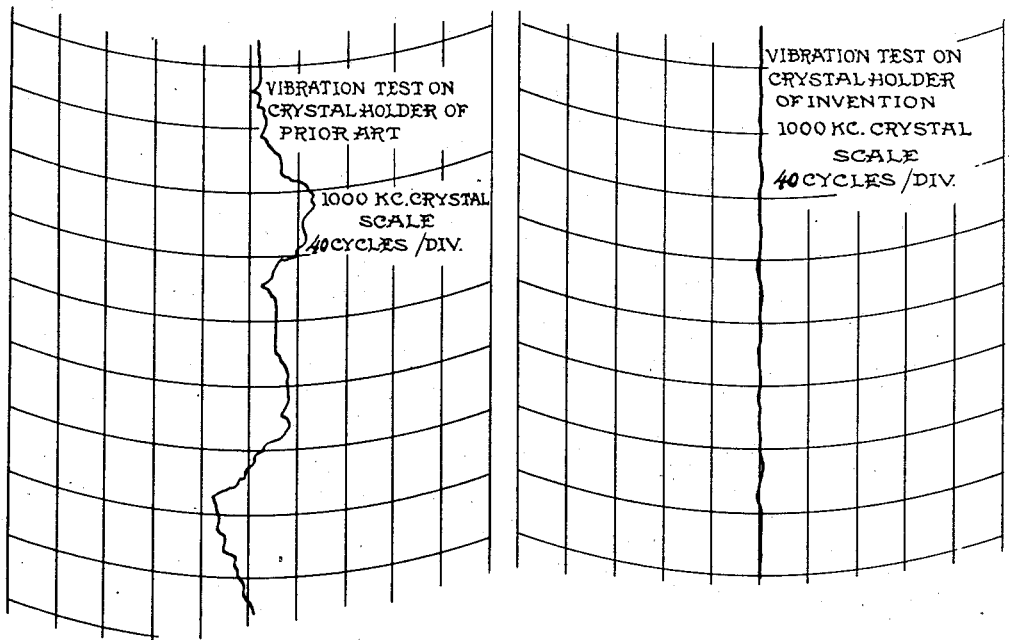
Figure 8:
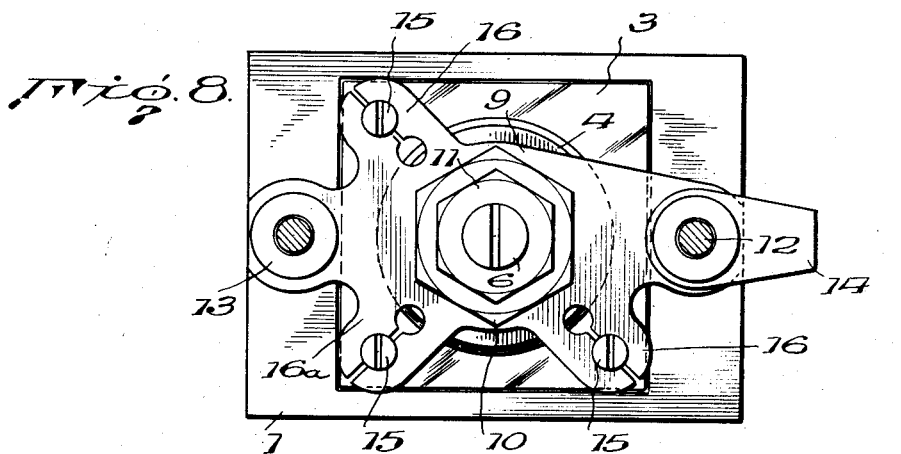
Figure 9:
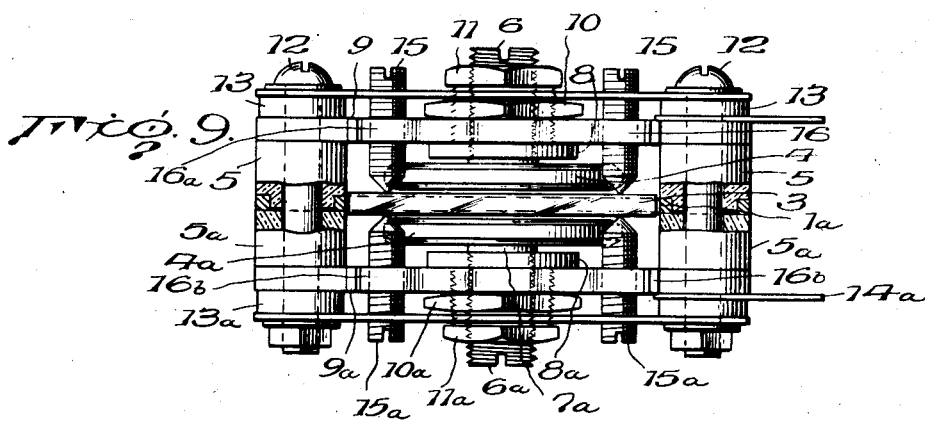
Figure 10:
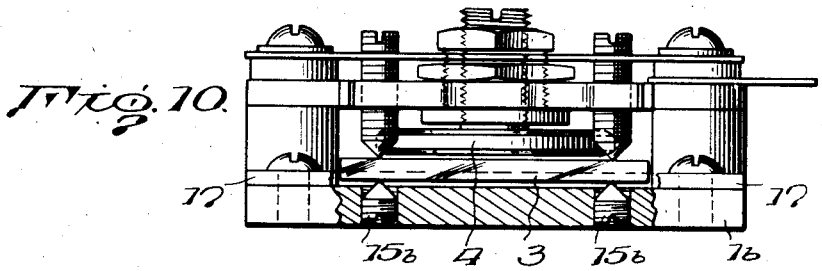

Briefly, Fig. 1 is a view in side elevation of the crystal holder; Fig. 2 is a view along the line 2—2 of Fig. 1; Fig. 3 is a view along the line 3—3 of Fig. 1; Fig. 4 is a view along the line 4—4 of Fig. 1; Fig. 5 is a top view; Fig. 6 is a curve showing the frequency stability of a prior art crystal holder in a vibration test; Fig. 7 is a curve showing the frequency stability of the holder of the present invention in the same test; Figs. 8 and 9 illustrate a modified form of this holder and Fig. 10 illustrates another modified form of this holder.

Referring to the drawing in detail reference numeral 1 designates the bottom or base electrode of the holder. This bottom or base electrode 1 has a circular central milled-out portion 2 as shown in Fig. 2, cut to the required air-gap depth of 0.003" to 0.0035", the crystal 3 resting on its corners on the base electrode. The top electrode 4 is variable, and is spaced by ceramic spacers 5 or other insulating material, and it can be adjusted away from the opposite face of the crystal by using a screw driver or other tool fitting the slot 6. The electrode 4 is provided with a threaded stem 7 which is threaded into the bushing 8 held on the bridge member 9 by the nut 10. The stem 7 is threaded with a left hand thread to prevent accidental adjustment of the top electrode 4 and a tightening nut 11 is attached to the top of this stem to tighten the stem with respect to the bushing 8. A pair of screws 12 are employed for holding the bridge 9 on the tops of the ceramic spacers 5 and additional ceramic spacers or washers 13 are provided around these screws 12 to space and electrically insulate said screws from the bridge 9. These screws function to maintain the crystal and holder electrodes assembled and the bridge 9 in addition to carrying the top electrode 4 also functions to complete the electrical circuit thereto so that electrical connections for the top electrode may be made to the lug 14. The top bridge 9 of the mounting which holds the variable air-gap electrode 4 also carries two threaded adjustable studs 15 which can be adjusted to meet and touch the crystal. These screws 15 are adjusted to within several ten thousandths of an inch of the crystal face. This is a very simple matter; each screw is first turned down until it touches the crystal, and then it is backed off a slight amount, just sufficient to free the crystal. By adjusting both screws in this manner, the crystal movement towards and away from the electrodes is limited to a very small amount, of the order of several ten thousandths of an inch, and it is this limiting feature and the fact that an air-gap is employed on both sides of the crystal which produces the tremendous improvement in frequency stability.

Both of the screws 15 are provided with slightly rounded or blunt points so that they do not injure the crystal during adjustment. This may also be prevented by using screws of relatively soft material such as brass. It is, of course, obvious that screws of insulation material also may be employed.

The member 9 is provided with a pair of bifurcated arms 16 for supporting the screws 15 which are snugly threaded into the forks of the arms and the line of bifurcation passes through the threaded screw holes so that the screws are held in said screw holes under pressure applied by said forks.

The ceramic spacers 5 may be lapped substantially parallel so that the bridge 9 is supported practically parallel to the crystal faces and the electrode 4 may be accurately adjusted with respect thereto.

It is also desirable to limit the movement of the crystal laterally, that is, parallel to the electrodes, and this can be accomplished by using side bars 17 which are screwed to the base electrode. The tolerance on these, however, is not critical, and can vary over wide limits. The crystal movement laterally may be of the order of thirty to forty thousandths of an inch without sacrificing much in frequency stability. By using oval shaped holes in the side bars, it is possible, however, to adjust these towards and away from the edges of the crystal so as to limit this movement.

Where desired the base 1a may be made rather thin and cut away in the center opposite the crystal 3 so that the crystal extends into this cut away portion partially or entirely to the opposite side of the base 1a and additional retaining screws 15a may be provided on the under side of the crystal as shown in Fig. 9. In this way the crystal is retained between two sets of these screws 15 and 15a, one set on the top as shown and another set on the bottom. A bridge 9a and ceramic spacers 5a are provided to support the bottom screws 15a the same as the top screws are supported. An electrode 4a is also employed on the bottom of the crystal and air-gaps are formed on both sides of the crystal. Furthermore in this case it may be desirable to employ three screws on the top, supported by the arms 16 and 16a as shown in Fig. 8, and three on the bottom, supported by arms such as 16b similar to 16a, instead of two.

Furthermore the milled out portion 2 of the base 1 may be dispensed with simply by providing two or three screws such as screws 15b screwed into the base from the bottom thereof so that the crystal 3 will rest on these screws or between these screws and the screws 15 so as to provide an air-gap between the base and the bottom surface of the crystal as illustrated in Fig. 10.

As an example of the improved performance two curves Figs. 6 and 7 are shown. Fig. 6 illustrates the performance obtained when the old style mounting is used with the crystal resting freely against a plane flat electrode, and employing an air-gap and top electrode; and Fig. 7 illustrates results obtained when the new type mounting is employed. These two curves were run under the same conditions of vibration, and the greatly improved frequency stability is very apparent with this invention.

The holder of my invention is applicable to a wide range of frequencies, although at the higher frequencies the air-gap employed must be slightly reduced because of the effect which the gap has on the activity. If the air-gap is reduced to the neighborhood of one thousandth of an inch, this same type of mounting can be used at much higher frequencies than the original limits given. At the higher frequencies, however, it is generally desirable to clamp the crystal, because the clamping has very little effect on the crystal activity.

The foregoing specification is a description of an embodiment of this invention and I do not desire to limit this invention to the exact details described except insofar as they are defined by the claims.

What I claim is as follows:

1. Piezo electric crystal apparatus, comprising: a piezo electric crystal having a pair of major faces, electrodes for said major faces, one of said electrodes being adjustable with respect to the corresponding one of said faces to provide an air-gap therebetween, and means for substantially preventing the movement of said crystal toward or away from at least one of said electrodes during vibration of the apparatus, said means comprising adjustable members extending to and almost touching face portions of said crystal to define and substantially prevent movement of said crystal toward or away from the aforesaid electrode but not affect operation thereof.

2. Piezo electric crystal apparatus, comprising: a piezo electric crystal having a pair of major faces, electrodes for said major faces, one of said electrodes being adjustable with respect to the corresponding one of said faces to provide an air-gap therebetween, means for substantially preventing the movement of said crystal toward or away from at least one of said electrodes during vibration of the apparatus, said means comprising adjustable members extending to and almost touching face portions of said crystal to define and substantially prevent movement of said crystal toward or away from the aforesaid electrode but not affect operation thereof, and adjustable side bars for limiting the movement of said crystal in directions parallel to the major faces thereof.

3. Piezo electric crystal apparatus, comprising: a piezo electric crystal having a pair of major faces, electrodes for said major faces, one of said electrodes having a threaded neck portion for adjusting said electrode with respect to the corresponding one of said faces to provide an air-gap therebetween, and means for substantially preventing the movement of said crystal toward or away from at least one of said electrodes during vibration of the apparatus, said means comprising adjustable members extending to and almost touching face portions of said crystal to define and substantially prevent movement of said crystal toward or away from the aforesaid electrode but not affect operation thereof.

4. Piezo electric crystal apparatus, comprising: a piezo electric crystal having a pair of major faces, electrodes for said major faces, a bridge member extending over said crystal, one of said electrodes having a threaded neck portion through said bridge member for adjusting said electrode with respect to the corresponding one of said faces to provide an air-gap therebetween and means for substantially preventing the movement of said crystal toward or away from at least one of said electrodes during vibration of the apparatus, said means comprising adjustable members extending to and almost touching face portions of said crystal to define and substantially prevent movement of said crystal toward or away from the aforesaid electrode but not affect operation thereof.

5. Piezo electric crystal apparatus, comprising: a piezo electric crystal having a pair of major faces, a base plate having a milled out portion functioning as one of the electrodes for one of said major faces, spacer means, a bridge member supported on said base plate by said spacer means, an adjustable electrode having a stem threaded through said bridge member, said bridge member having a pair of arms extending from the sides thereof and over said crystal, and a pair of screw members threaded through said arms for extending to and almost touching face portions of said crystal to define and substantially prevent movement of said crystal toward or away from at least one of said electrodes but not affect operation thereof.

6. Piezo electric crystal apparatus, comprising: a piezo electric crystal having a pair of major faces, a base plate having a milled out portion functioning as one of the electrodes for one of said major faces, spacer means, a bridge member suported on said base plate by said spacer means, an adjustable electrode having a stem threaded through said bridge member, said bridge member having a pair of bifurcated arms extending from the sides thereof and over said crystal, and a pair of screw members snugly threaded through said arms between the forks of each of said arms for extending to and almost touching face portions of said crystal to define and substantially prevent movement of said crystal toward or away from at least one of said electrodes but not affect operation thereof.

7. Piezo electric crystal apparatus, comprising: a piezo electric crystal having a pair of major faces, a base plate having a milled out portion functioning as one of the electrodes for one of said major faces, spacer means, a bridge member suported on said base plate by said spacer means, an adjustable electrode having a stem threaded through said bridge member, said bridge member having a pair of arms extending from the sides thereof and over said crystal, and a pair of relatively small screw members having relatively blunt points threaded through said arms for extending to and almost touching face portions of said crystal to define and substantially prevent movement of said crystal toward or away from at least one of said electrodes but not affect operation thereof.

8. Piezo electric crystal apparatus, comprising: a piezo electric crystal having a pair of major faces, a base plate having a milled out portion functioning as one of the electrodes for one of said major faces, spacer means, a bridge member supported on said base plate by said spacer means, an adjustable electrode having a stem threaded through said bridge member, said bridge member having a pair of arms extending from the sides thereof and over said crystal, a pair of screw members snugly threaded through said arms for extending to and almost touching face portions of said crystal to define and substantially prevent movement of said crystal toward or away from at least one of said electrodes but not affect operation thereof, and side bars attached to said base substantially to prevent sidewise movement of said crystal between said electrodes.

9. Piezo electric crystal apparatus, comprising: a piezo electric crystal having a pair of major faces, electrodes for said major faces, said electrodes being adjustable with respect to the corresponding said faces to provide an air-gap therebetween, and means for substantially preventing the movement of said crystal toward or away from said electrodes during vibration of the apparatus, said means comprising adjustable members extending to and almost touching face portions of said crystal to define and substantially prevent movement of said crystal towards or away from at least one of said electrodes, thereby preventing frequency variation without affecting the activity thereof.

10. Piezo electric crystal apparatus, comprising: a piezo electric crystal having a pair of major faces, electrodes for said major faces, said electrodes being adjustable with respect to the corresponding said faces to provide an air-gap therebetween, and means extending to and almost touching face portions of said crystal to define and substantially prevent movement of said crystal towards or away from at least one of said electrodes, thereby preventing frequency variation without affecting the activity thereof.

11. Piezo electric crystal apparatus, comprising: a piezo electric crystal having a pair of major faces, electrodes for said major faces, said electrodes being adjustable with respect to the corresponding ones of said faces to provide an air-gap therebetween, and a plurality of screw members extending to and almost touching face portions of said crystal to define and substantially prevent movement of said crystal towards or away from at least one of said electrodes, thereby preventing frequency variation without affecting the activity thereof.

12. Piezo electric crystal apparatus, comprising: a piezo electric crystal having a pair of major faces, a base plate having a milled out portion functioning as one of the electrodes for one of said major faces, spacer means, a bridge member supported on said base plate by said spacer means, an adjustable electrode having a stem threaded through said bridge member, said bridge member having a pair of arms extending from the sides thereof and over said crystal, a pair of screw members snugly threaded through said arms for extending to and almost touching face portions of said crystal to define and substantially prevent movement of said crystal towards or away from at least one of said electrodes, thereby preventing frequency variation without affecting the activity thereof.

13. Piezo electric crystal apparatus, comprising: a piezo electric crystal having a pair of major faces, a base plate having a milled out portion functioning as one of the electrodes for one of said major faces, spacer means, a bridge member supported on said base plate by said spacer means, an adjustable electrode having a stem threaded through said bridge member, said bridge member having a pair of arms extending from the sides thereof and over said crystal, a pair of screw members snugly threaded through said arms for extending to and almost touching face portions of said crystal to define and substantially prevent movement of said crystal towards or away from at least one of said electrodes, thereby preventing frequency variation without affecting the activity thereof, and side bars attached to said base substantially to prevent sidewise movement of said crystal between said electrodes.

14. Piezo electric crystal apparatus, comprising: a piezo electric crystal having a pair of major faces, spacer means, a pair of bridge members supported in spaced relation around said crystal by said spacer means, a pair of adjustable electrodes each having a stem threaded through the corresponding said bridge member, each of said bridge members having a pair of arms extending from the sides thereof and over said crystal, a pair of screw members snugly threaded through each of said arms for extending to and almost touching face portions of said crystal to define and substantially prevent movement of said crystal towards or away from at least one of said electrodes, thereby preventing frequency variation without affecting the activity thereof, and means attached to said spacer means substantially to prevent sidewise movement of said crystal between said electrodes.

JOHN M. WOLFSKILL.